United States Patent [19]

Kufrovich et al.

[11] Patent Number: 4,471,535
[45] Date of Patent: Sep. 18, 1984

[54] FOUR WAY UTILITY LEVEL

[76] Inventors: John A. Kufrovich, c/o George Spector, 3615 Woolworth Bldg., 233 Broadway; George Spector, c/o John A. Kufrovich, 3615 Woolworth Bldg., 233 Broadway, both of, New York, N.Y. 10007

[21] Appl. No.: 409,618

[22] Filed: Aug. 19, 1982

[51] Int. Cl.³ ............................................... G01C 9/28
[52] U.S. Cl. ......................................... 33/378; 33/387
[58] Field of Search ................. 33/334, 343, 378, 384, 33/385, 387, 388, 389, 390

[56] References Cited

U.S. PATENT DOCUMENTS

| 592,537 | 10/1897 | Carriere | 33/384 |
| 1,215,035 | 2/1917 | Kocisko | 33/387 |
| 2,527,961 | 10/1950 | Rantz | 33/388 |
| 2,692,440 | 10/1954 | Walters | 33/387 |
| 4,320,581 | 3/1982 | Ousterhout | 33/388 |

FOREIGN PATENT DOCUMENTS 2645727  4/1978  Fed. Rep. of Germany ........ 33/384

Primary Examiner—Richard R. Stearns

[57] ABSTRACT

An improved four way utility level, including a flat plate having a protractor engraved on one side, and a leveling unit mounted thereupon that includes a rotatable bubble assembly toothed to a gear which is toothed to a gear formed on a pivotable handle.

2 Claims, 9 Drawing Figures

U.S. Patent  Sep. 18, 1984  4,471,535
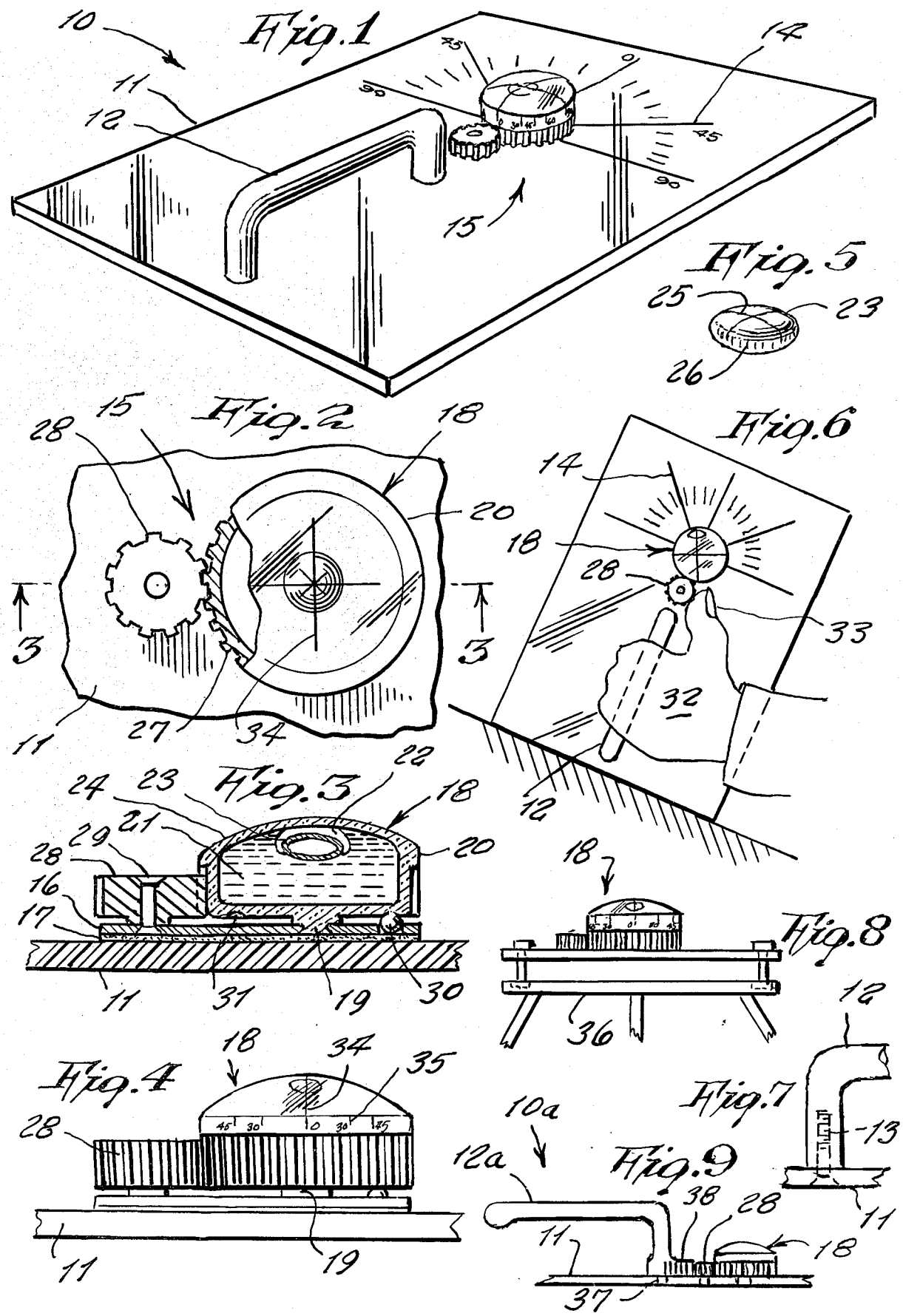

FOUR WAY UTILITY LEVEL

This invention relates generally to levels such as are used by carpenters, masons and the like for leveling a construction, a machine or other installation.

It is well known that most conventional leveling instruments comprise a slightly arched transparent tube sealed with a liquid and a bubble of air so as to indicate the horizontal position in one plane. Usually such instruments are manufactured with at least two such tubes mounted at right angles to each other upon a flat surface bar so as to indicate the horizontal position of the surface. Others have been designed in the past, so as to be adjustable in different angles.

A principal object of the present invention is to provide an improved leveling unit which is circular instead of tubular so that it can be used to indicate the horizontal position of a planar surface, said unit is calibrated relative to reference lines on a mounting plate and includes a handle for quick and easy use.

Another object is to provide an improved four way utility level in which a small float is carried in the air bubble thereof, the float being marked with crossing hair lines, so as to more precisely divide the air bubble.

FIG. 1 is a perspective view of the invention, shown including a gear to rotate the liquid bubble level unit.

FIG. 2 is a top view thereof.

FIG. 3 is a side cross sectional view on line 3—3 of FIG. 2.

FIG. 4 is a side view of the structure shown in FIGS. 2 and 3.

FIG. 5 is a perspective view of a bubble float.

FIG. 6 is a view showing the invention in use on an inclined surface.

FIG. 7 is a side view of a detail of the handle construction.

FIG. 8 shows the bubble unit of the invention adapted to an engineering transit.

FIG. 9 is a side view detail showing a different design in which the handle is made with a gear that rotates the bubble unit.

Referring now to the drawing in greater detail, and more particularly to FIGS. 1 through 7 thereof, at this time, the reference numeral 10 represents an improved four way utility level, according to the present invention, wherein there is a flat rectangular shaped, transparent, hard plastic plate 11 fitted with a U-shaped handle 12 secured to one side thereof by means of flat head screws 13. A protractor scale 14 is engraved upon the flat surface of the plate 11, and a leveling unit 15 is mounted upon the centerpoint of the protractor.

The leveling unit 15 includes a flat base 16 affixed upon a top side of the plate 11 by means of an adhesive 17.

A bubble assembly 18 is pivotally mounted on the base 16 by means of a pivot post 19. The bubble assembly includes a transparent, circular case 20 containing an oil 21 and a small air space 22 in which there floats an air filled, hollow float 23. A circular top wall 24 of the case is upwardly rounded, and the air space quantity is such that the float does not touch the underside of the top wall. The float is circular with outwardly bulging top and bottom sides. Cross hair lines 25 and degree lines 26 are ingraved on the float, so to serve for fine reading.

Gear teeth 27 are formed around the side edge of the case 20 which engage the teeth of a circular gear 28 also pivotally mounted on the base 16 by means of a pivot pin 29.

A detent roller 30 between the bubble assembly and the base 16 selectively engages notches 31 on an underside of the case for retaining the case in any rotational position.

In operative use, a hand 32 grasps the handle 12 while a thumb 33 of the hand rotates the gear 28 so that cross line hairs 34 and degree marks 35 of the case, are adjustable respective to the protractor, as wished.

In FIG. 8, the above described bubble assembly 18 is shown installed on a transit 36.

In FIG. 9, a modified design of improved four way utility level 10a is shown which is a same as the level 10 except that the handle 12a thereof is pivotable about a pin 37, and a plurality of teeth 38 formed on the handle engage the gear 28 so to be easier for turning the same.

While various changes may be made in the detail construction, it is understood that such changes will be within the spirit and scope of the present invention as is defined by the appended claims.

What is claimed is:

1. An improved four way utility float, comprising in combination a flat, rectangular plate, a handle on one side of said plate, a protractor scale engraved on said side of said plate, and a leveling unit also affixed on said plate side, said leveling unit comprising a stationary base, a rotatable bubble assembly and a rotatable gear on said base engaging coacting teeth on said bubble assembly which further comprises a transparent case filled with oil and an air space having a hollow float floating therein, said bubble assembly being centered on a centerpoint of said protractor scale, with degree calibrations provided on said bubble case, said handle being located adjacent said gear whereby the handle can be grasped while turning the gear with the thumb of the same hand.

2. The combination as set forth in claim 1, wherein said handle is pivotably mounted on said plate, with geat teeth formed on said handle engaging said gear, whereby said gear is rotated by handle rotation.

* * * * *